United States Patent [19]

Meadows

[11] 3,924,482
[45] Dec. 9, 1975

[54] ENDLESS POWER TRANSMISSION BELT AND METHOD OF MAKING SAME

[75] Inventor: Roger D. Meadows, Waynesville, N.C.

[73] Assignee: Dayco Corporation, Dayton, Ohio

[22] Filed: Jan. 10, 1974

[21] Appl. No.: 432,276

[52] U.S. Cl. .................. 74/234; 156/139; 156/141
[51] Int. Cl.² ........................................ F16G 5/08
[58] Field of Search .......... 74/231 R, 233, 234, 237; 161/133, 195; 156/137, 138, 139, 140, 141

[56] References Cited
UNITED STATES PATENTS

| | | | |
|---|---|---|---|
| 556,663 | 3/1896 | Dennison | 74/237 |
| 1,923,542 | 8/1933 | Keyes et al. | 74/233 |
| 2,121,222 | 6/1938 | Freedlander | 161/58 |
| 2,211,202 | 8/1940 | Freedlander | 74/237 |
| 2,429,994 | 11/1947 | Crosby | 74/233 |
| 2,439,043 | 4/1948 | Evans | 161/144 |
| 2,519,590 | 8/1950 | Mitchell | 74/233 |
| 2,608,874 | 9/1952 | Waugh | 74/233 |
| 2,711,778 | 6/1955 | Waugh | 74/233 |
| 2,792,319 | 5/1957 | Fihe | 74/233 |
| 3,212,627 | 10/1965 | Beebee | 74/237 |
| 3,348,422 | 10/1967 | Richmond | 74/233 |
| 3,479,892 | 11/1969 | Cicognani | 74/237 |
| 3,564,933 | 2/1971 | Clinkenbeard | 74/233 |
| 3,761,335 | 9/1973 | Cichoski et al. | 156/195 |

FOREIGN PATENTS OR APPLICATIONS

| | | | |
|---|---|---|---|
| 1,173,206 | 2/1959 | France | 74/234 |
| 89,942 | 6/1896 | Germany | 74/237 |
| 1,326,670 | 8/1973 | United Kingdom | 74/237 |

*Primary Examiner*—Samuel Scott
*Assistant Examiner*—A. Russell Burke
*Attorney, Agent, or Firm*—Reuben Wolk

[57] ABSTRACT

An endless power transmission belt and method of making same is provided wherein such belt has a belt body and a woven cover therefor in the form of an elongated strip having warps and wefts therein with the warps extending parallel to the length of the strip and the strip being helically wrapped around the body so that the strip and thus its warps are arranged at an angle relative to a central longitudinal axis through the belt to provide the woven cover as a bias cover which is in a relaxed or unstressed condition.

12 Claims, 7 Drawing Figures

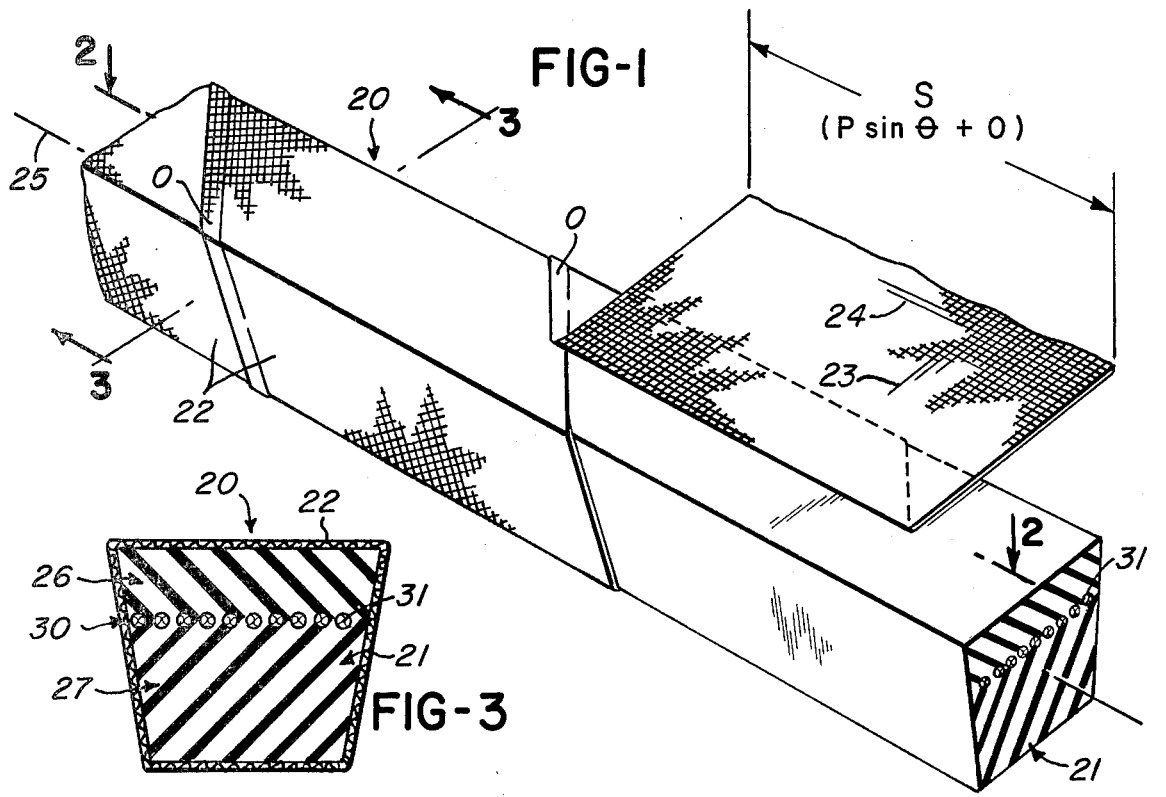
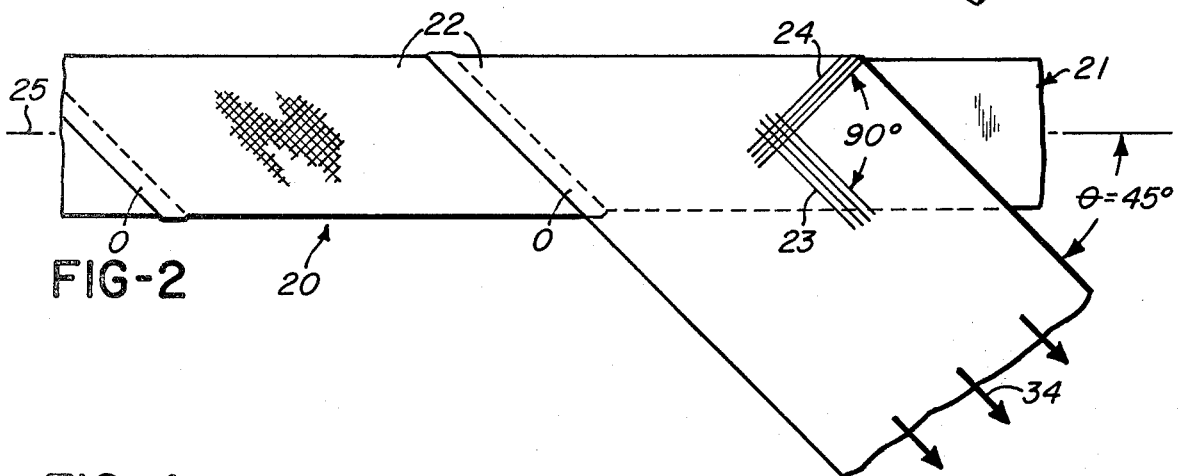
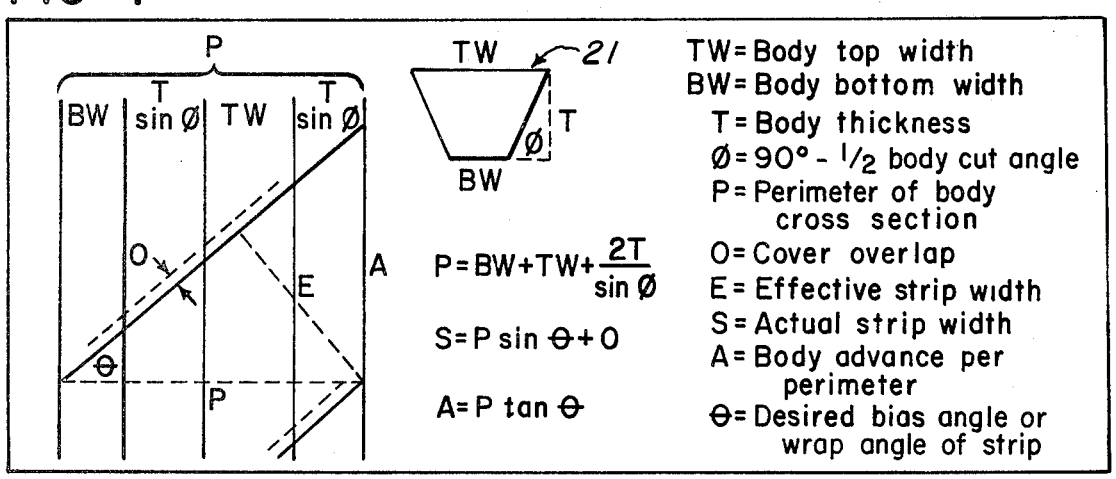

ENDLESS POWER TRANSMISSION BELT AND METHOD OF MAKING SAME

BACKGROUND OF THE INVENTION

It is known in the art to provide a woven fabric cover on an endless power transmission belt body so that the cover is a bias cover in that it has warps and wefts arranged at an angle with respect to the longitudinal axis of the belt; and, such a bias cover is provided to improve the flexibility of the belt as it moves in an endless path about associated pulleys or sheaves.

One technique currently used for providing such a belt cover is to bias cut woven cover stock at an angle to the warps and wefts thereof and define ribbons thereof which are suitably fastened end-to-end to form an elongated strip which is applied in a known manner about the circumference of an endless belt body to define a cover for the belt having a circumferential seam. However, a serious problem with this type of operation is that it stretches the strip as it is applied leaving it in a stressed condition in the completed belt whereupon as the belt is moved in an endless path about associated pulleys or sheaves there is a tendency for premature failure of such a cover and belt.

It is also known to provide an endless power transmission belt with an outer cover formed from a cord material wrapped helically around the belt with adjoining turns of the cord material being held together by a rubber-like binder. However, a serious problem with this type of belt is that as it operates about associated sheaves and particularly in environments which attack and thus tend to deteriorate the rubber-like binder, the cover-defining cord material tends to separate and cause premature failure of the associated belt.

SUMMARY

This invention provides an improved endless power transmission belt and method of making the same wherein such belt overcomes the problems of previously proposed belts, and such belt has a high-strength woven cover which is made and applied with optimum economy and simplicity. In particular, the endless power transmission belt has a belt body which is primarily an elastomeric body and a woven cover therefor in the form of an elongated strip having warps and wefts therein. The warps extend parallel to the length of the strip and the strip is helically wrapped around the body so that the strip and thus its warps are arranged at an angle relative to a central longitudinal axis through said belt to provide the woven cover as a bias cover which is unstressed and thus in a relaxed condition. The strip may be wound with an overlap between adjoining turns and when thus wound the width of the strip is determined by the formula $S = P \sin \theta + O$, where $S$ = actual strip width
$P$ = perimeter of body cross section
$\theta$ = said angle relative to said axis
$O$ = strip overlap Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in cross section and parts broken away illustrating one exemplary embodiment of an endless power transmission belt of this invention and the method of applying a single thickness square-woven cover thereover with an overlap between adjoining turns;

FIG. 2 is a fragmentary top plan view taken essentially on the line 2—2 of FIG. 1;

FIG. 3 is an enlarged cross sectional view taken essentially on the line 3—3 of FIG. 1;

FIG. 4 is a rectangular block presentation showing the derivation of a formula used to determine the actual width of a strip used to define the cover of the belt of this invention while correlating various parts of the formula with the actual belt cross-sectional outline;

DESCRIPTION OF ILLUSTRATED EMBODIMENTS

Figure 5:
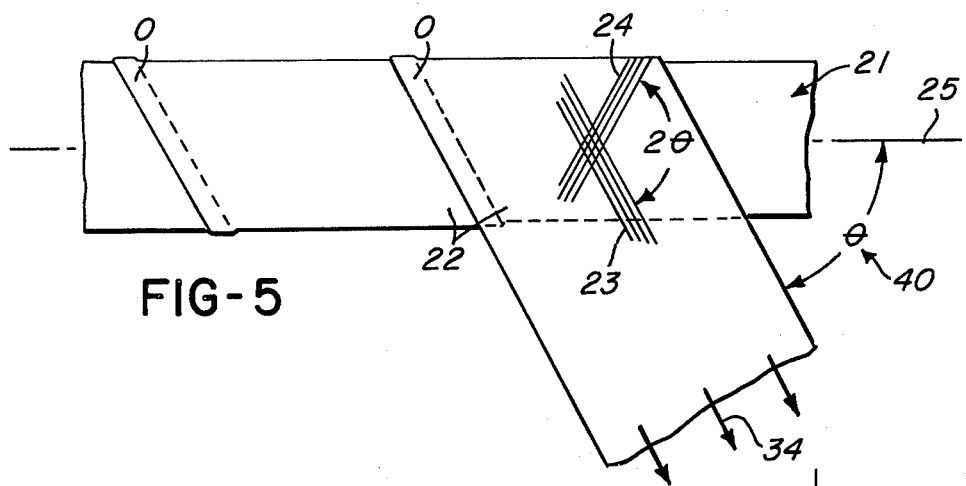
FIG. 5 is a view similar to FIG. 2 illustrating the application of a stress relieved woven fabric which has warps and wefts arranged at an angle other than 90°.

Reference is now made to FIG. 1 of the drawings which illustrates one exemplary embodiment of an endless power transmission belt of this invention which is designated generally by the reference numeral 20. The belt 20 has a belt body or core which is made primarily of one or more elastomeric materials and such body is designated generally by the reference numeral 21, and a woven cover is provided for the body 21 and the cover is in the form of an elongated strip which, for convenience, is designated by the reference numeral 22 both in its wrapped and unwrapped condition. The strip 22 has warps 23 and wefts 24 therein, see FIG. 2, and the warps 23 extend parallel to the length of the strip and it will be seen that the strip 22 is helically, often more loosely referred to as being spirally, wrapped around the body 21 so that the strip 22 and thus its warps 23 are arranged at an angle shown as an angle $\theta$ to a central longitudinal axis 25 through the belt 20 to thereby provide the woven cover 22 as a bias cover which is unstressed and is thus in a relaxed condition, whereby the cover 22 and belt 20 may be operated even around small diameter sheaves for extended periods with minimum tendency for failure.

As seen particularly in FIG. 3 of the drawings the belt of this invention has a substantially trapezoidal cross-sectional configuration and is often popularly referred to as a V-belt; and, the belt 20 has a tension section 26, a compression section 27, and a load-carrying section which is designated generally by the reference numeral 30 and includes a helically wound load-carrying cord 31. The tension section 26 and compression section 27 are preferably made of any suitable elastomeric material known in the art and the load-carrying section may be comprised of any suitable strength member or members.

As seen particularly in FIG. 2 of the drawings the exemplary strip 22 is in the form of a square-woven strip, i.e., the warps 23 and the wefts 24 are arranged at substantially 90° or perpendicular to each other. Further, the strip 22 is wound in a helical pattern about the main body 21 as illustrated in FIGS. 1 and 2 so that the warps 24 are arranged at an angle θ with the central longitudinal axis 25 of the belt 20 whereby the warps 23 are arranged at the angle θ and the wefts 24 are arranged at an angle relative to the warps which is two times the angle θ. In the illustration of FIG. 2 wherein a square-woven fabric is utilized it will be seen that the warps are arranged at an angle θ = 45° with respect to a side of the belt and hence the longitudinal axis 25 of such belt and the wefts 24 are arranged at two times the angle θ or 90°. Further, the warps 23 and the wefts 24 are arranged in a symmetrical manner relative to the axis 25 and in particular it will be seen that such warps and wefts are symmetrically arranged on opposite sides of said axis 25 each at an angle of roughly 45° therewith.

The endless power transmission belt 20 of this invention is provided so that the strip 22 is wound or wrapped with an overlap 0 between adjoining turns and the width of the strip, in accordance with the teachings of this invention, is determined by the formula S = P sin θ + 0, where S = actual strip width
P = perimeter of body cross section
θ = the angle of the strip 22 relative to the axis 25
0 = the strip overlap The above formula is determined essentially as presented in FIG. 4 of the drawings which shows a cross-sectional outline of a belt body 21 with the cross-hatching eliminated, for clarity. In accordance with the presentation of FIG. 4, it will be seen that TW = body top width
BW = body bottom width
T = body thickness
φ = 90° − ½ body cut angle
P = perimeter of body cross section
0 = cover overlap
E = effective strip width
S = actual strip width
A = body advance per perimeter
θ = desired bias angle of strip relative to longitudinal axis through belt body.

With the above-identified belt portions it will be seen from FIG. 4 that $$P = BW + TW + \frac{2T}{\sin \phi}$$

S = P sin θ + 0
A = P tan θ

Therefore, it will be seen that the actual width of the strip 22 with a small overlap 0 between adjoining turns is determined by the formula S = P sin θ + 0.

Figure 6:
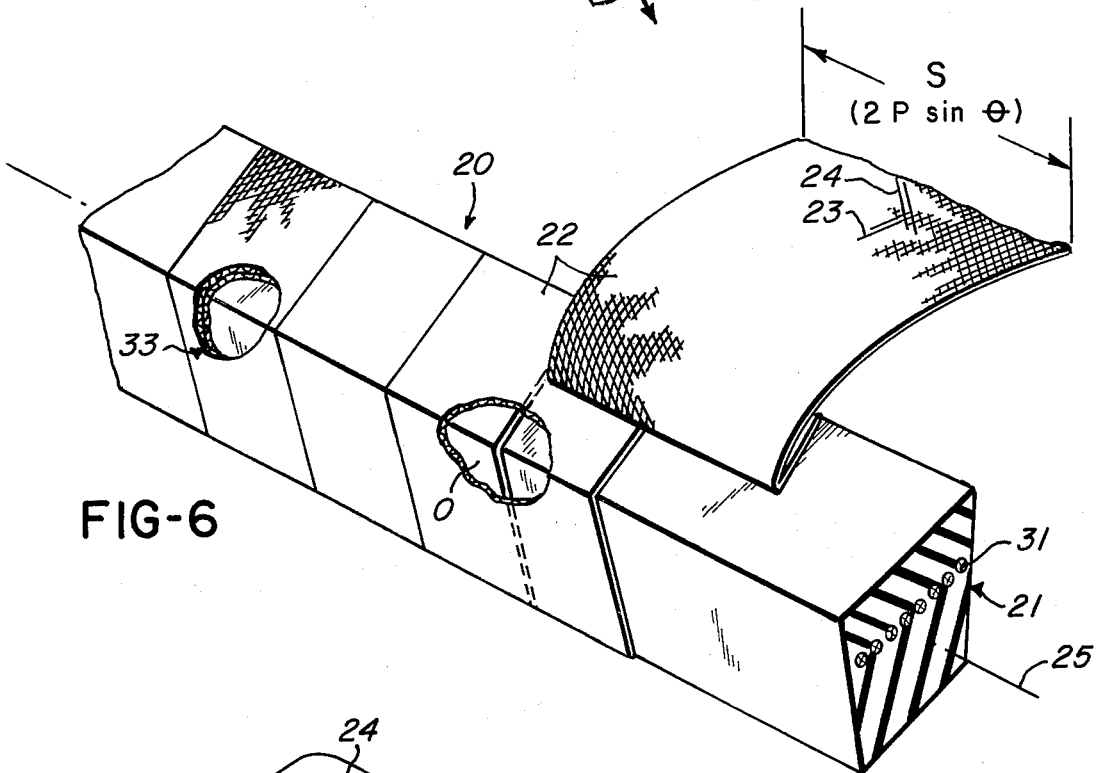
FIG. 6 is a view similar to FIG. 1 illustrating the wrapping of a belt body so that is has a double-thickness cover thereover.

However, it may be desired to provide a double thickness cover 22 for a belt 20 as illustrated at 33 in FIG. 6 of the drawing. In this latter instance, the actual width S of the strip 22 is equal to P sin θ + 0 however, if 0 is again equal to P sin θ, then the formula for the double thickness strip would simply be S = P sin θ + P sin θ or S for an overlap which defines a double thickness cover could be simply presented as S = 2 P sin θ.

If no overlap 0 is desired between adjoining turns of strip 22 whereby adjoining turns would be in abutting relation the formula would be without the value of 0 and simply S = P sin θ.

The strip 22 is shown in FIGS. 1 and 2 as a so-called square-woven fabric having warps and wefts arranged at 90° to each other; and, the strip 22 is wrapped in position around the belt body 21 so that the cover 22 is unstressed and hence in a relaxed condition. This winding or wrapping of the cover strip 22 so that it is in a relaxed condition is achieved simply because the winding forces are applied, as illustrated by the arrows 34 in FIG. 2, essentially parallel to the strength members or warps 23 of the strip 22. Accordingly, there is no tendency, during wrapping, for the strip 22 to tend to neck down or otherwise be in any kind of a stressed condition.

Thus, it is seen that this invention not only teaches an improved belt having a relaxed or unstressed outer cover but also teaches a method of making an endless power transmission belt wherein the belt body may be formed in any suitable manner known in the art whereupon a woven cover is provided in the form of an elongated strip having the warps 23 and the wefts 24 therein with the warps extending parallel to the length of the strip. The strip is then helically wrapped around the body 21 so that the strip 22 and thus its warps 23 are arranged at an angle θ relative to the central longitudinal axis 25 through the belt 20 to provide the woven cover 22 as a bias cover, i.e., the warps and wefts are at an angle, to the longitudinal axis, yet such bias cover is in a relaxed condition due to the fact that the wrapping action is achieved by exerting the wrapping forces parallel to and along the warps 23. As explained previously, the width of the strip 22 is determined by the formula S = P sin θ + 0 with the derivation of such formula being as presented earlier and as explained in connection with FIG. 4 of the drawings.

Similarly, to provide a belt having a double thickness cover and of the character presented in FIG. 6 it will be appreciated that the width of the strip 22 is determined by the formula S = 2P sin θ; and, for a single thickness cover having adjoining turns in abutting relation the width of the strip 22 is determined by the formula S = P sin θ.

Figure 7:
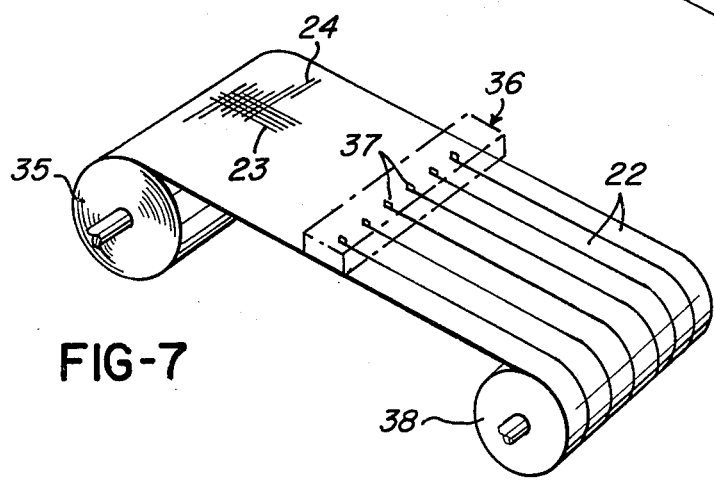
FIG. 7 is a schematic view particularly illustrating the manner in which a plurality of elongated strips may be defined in a simultaneous manner from a supply roll of woven fabric material.

The method of this invention makes it possible to provide a supply roll 35 of fabric essentially as illustrated in FIG. 7 of the drawings and whereupon the roll 35 is subjected to the action of a gang slitting apparatus or machine 36 having cutting blades 37 to define a plurality of strips 22 in a substantially simultaneously manner and these gang cut strips 22 are wound on a plurality of spools 38. The cutting action is achieved parallel to, preferably between, the warps 23 whereby with this approach it is possible to provide a plurality of strips 22 in a simple and efficient manner and such strips 22 are of a length equal to the total length of the fabric defining the roll 35 and it is not necessary to fasten short pieces of strip together as is required using present techniques of the type previously mentioned.

The supply roll 35, cutting blades 37, and machine 36 have been shown schematically for convenience and simplicity, and it is to be understood that these components and associated apparatus are suitably supported, driven, etc. in accordance with techniques which are well known in the art.

The angle θ of application or wrapping is shown in FIGS. 1 and 2 as being 45° for square-woven fabric. However, it will be appreciated that the strip 22 need not necessarily be made of a square-woven fabric and indeed may be so-called stress-relieved fabric made by spiral cutting of a tubular woven fabric, or the like. In this latter instance the desired lead angle θ is a value other than 45° but in each instance would still be ½ the bias angle, and for a stress-relieved fabric having an angle greater than 90° between the warps 23 and wefts 24, as shown in FIG. 5, the lead angle $\theta$ is greater than 45° as shown at 40.

The stress relieved fabric is also gang slit using machine 36 and blades 37 parallel to the warps 23 of the fabric in a similar manner as illustrated in FIG. 7 for the square-woven fabric. Further, the stress-relieved or non-square-woven strip 22 would be wrapped around an associated belt body in a similar manner as described in connection with FIGS. 1 and 2 for the square-woven fabric with the wrap angle $\theta$ being controlled as described before.

The strip 22 whether square-woven or stress-relieved may be wrapped in position either manually or utilizing any suitable apparatus known in the art. For example, the belt body 21 of the belt 20 may be stretched between a pair of sheaves (not shown) and a strip 22 of required width may be wound on an unwind mechanism and placed on a special movable holder (not shown). The free end of the strip 22 on the unwind mechanism is fastened to the body 21 so that it makes the angle $\theta$ with the longitudinal axis 25 of such body. The entire unwind mechanism is then rotated about the axis 25 while simultaneously rotating the sheaves to move the body 21 in its endless path whereby the strip 22 is wrapped around the body 21 with an overlap between turns to define the helical cover 22. As explained previously, the width of the strip 22 is determined by the formula $S = P \sin \theta + 0$.

The strip width is determined by the formula presented above irrespective of the configuration of the belt. Further, once the core 21 is covered with the strip 22 it is then suitably cured using known curing equipment and using techniques which are well known in the art.

The belt 20 of this invention has, in essence, a bias cover which is unstretched or is in a relaxed condition and such a cover enables the belt 20 of this invention to be readily usable over pulleys or sheaves of comparatively small diameter and for extended service periods.

It will also be appreciated that the cover or strip 22 whether square-woven or stress relieved and having warps and wefts at any other desired angle may have a suitable elastomeric material in the form of a synthetic plastic material or a natural or synthetic rubber compound suitably applied or embedded on one or both of its sides, between the warps and wefts thereof, and in any desired manner in accordance with techniques known in the art; yet, the width of the strip 22, manner in which such a strip may be gang slit, etc. are achieved as explained previously.

It will also be appreciated that the belt body 21 may be of any suitable cross-sectional configuration other than trapezoidal; and, such belt main body may be made in accordance with any technique known in the art and the concept of this invention is still fully applicable thereto.

It should also be understood that even though rubber has been illustrated, by cross-hatching, as comprising the various component sections of the belt 20 with the cord 31 comprising the load-carrying section 30 being shown as a textile cord; it will be appreciated that any suitable material may be used to define the various component sections of the belt and that the cord 31 or other load-carrying component may be made of any suitable material known in the art.

In the presentation of FIG. 6, cover or strip 22 is shown as a fabric in which the warps 23 and wefts 24 are at an angle other than 90°; however, it is to be understood that a square-woven cover strip 22 may be used, if desired, to define a double-thickness cover. Also, the concept of this invention may be used to define a cover having more than two thicknesses.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt having a belt body and a woven cover therefor in the form of an elongated strip having warps and wefts therein, said warps extending parallel to the length of said strip, said strip being disposed in a helical pattern around said body so that said strip and thus its warps are arranged at an angle relative to a central longitudinal axis through said belt to provide said woven cover as a bias cover which is in a relaxed condition.

2. A belt as set forth in claim 1 wherein said warps are arranged at said angle with said central longitudinal axis, said wefts are arranged at an angle relative to said warps which is two times said angle, and said warps and wefts are arranged symmetrically relative to said axis.

3. An endless power transmission belt having an elastomeric belt body and a woven cover in the form of an elongated strip having warps and wefts therein, said warps extending parallel to the length of said strip, said strip being disposed in a helical pattern around said body so that said strip and thus its warps are arranged at an angle relative to a central longitudinal axis through said belt to provide said woven cover as a bias cover which is in a relaxed condition.

4. A belt as set forth in claim 3 in which said strip is disposed with an overlap between adjoining turns and the width of said strip is determined by the formula $S = P \sin \theta + 0$; where
$S$ = actual strip width
$P$ = perimeter of body cross section
$\theta$ = said angle relative to said axis
$0$ = strip overlap 5. A belt as set forth in claim 4 in which said woven cover is impregnated with an elastomeric material.

6. A belt as set forth in claim 4 wherein said cover is a double thickness cover and the width of said strip is determined by the formula
$S = 2 P \sin \theta$ 7. A belt as set forth in claim 4 in which said elastomeric body comprises an outer tension section, an inner compression section, and a load-carrying section arranged between said tension and compression sections.

8. A belt as set forth in claim 7 in which said load-carrying section is made of a load-carrying cord which is disposed in a helical pattern.

9. A belt as set forth in claim 7 in which said body has a substantially trapezoidal cross-sectional configuration.

10. A belt as set forth in claim 4 wherein said warps are arranged at said angle $\theta$ relative to said central longitudinal axis, said wefts are arranged at an angle relative to said warps which is two times said angle $\theta$, and said warps and wefts are symmetrically arranged relative to said axis.

11. A belt as set forth in claim 10 in which said woven cover is a square-woven cover with said warps and wefts arranged at an angle of substantially 90° to each other, said warps are arranged at said angle θ having a value of 45° with said central axis, said wefts are arranged 90° relative to said warps, and said warps and wefts are symmetrically arraanged on opposite sides of said axis each at an angle of roughly 45° therewith.

12. A belt as set forth in claim 10 in which said woven cover is a stress-relieved cover and woven at an angle other than 90° between its warps and wefts.

* * * * *